Aug. 20, 1940.   W. OELSNER   2,212,181
ACOUSTICAL APPARATUS
Filed March 22, 1937   4 Sheets-Sheet 1

INVENTOR
Waldemar Oelsner
By Watson, Cait, Morse & Grindle
ATTYS

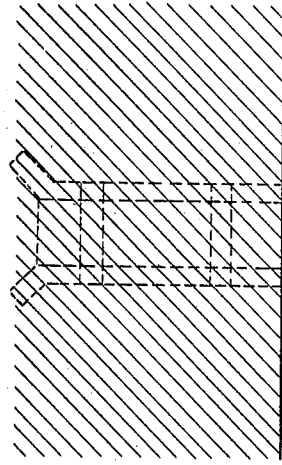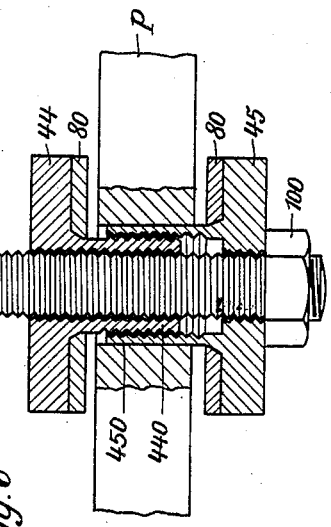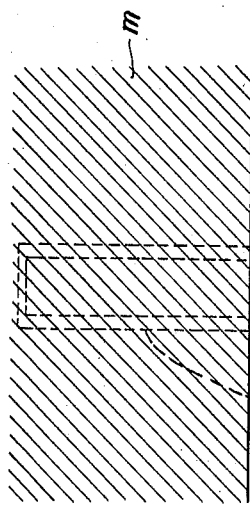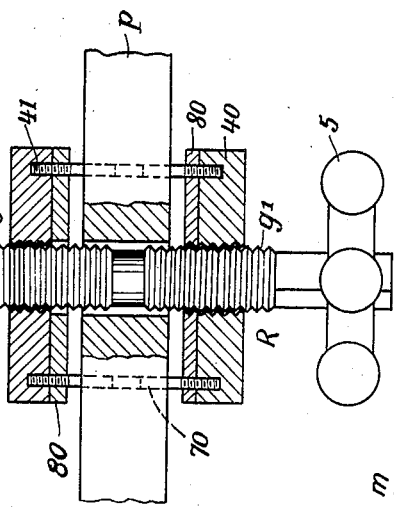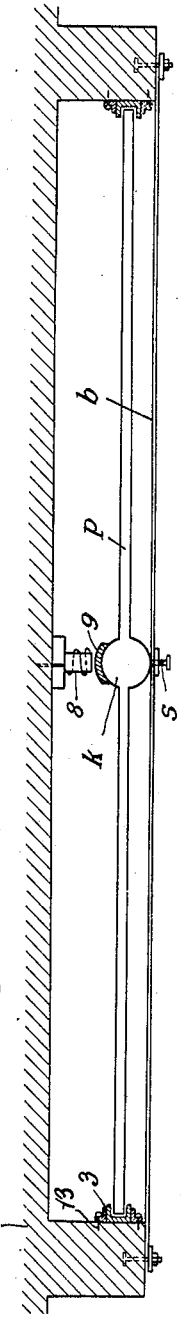

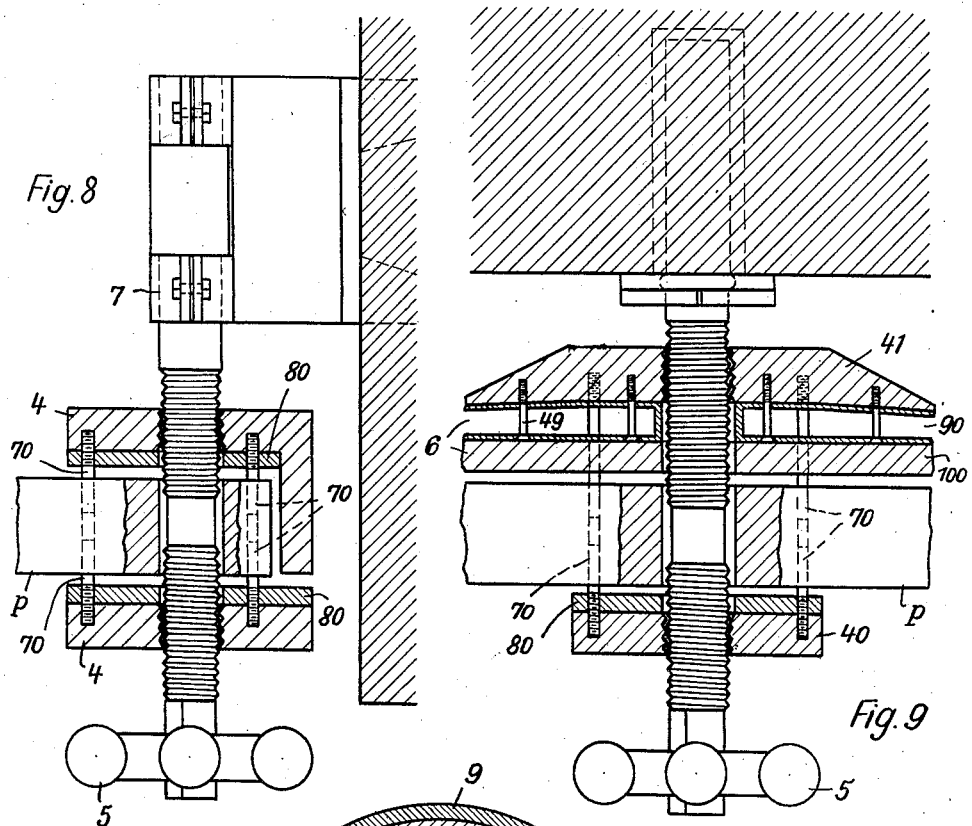
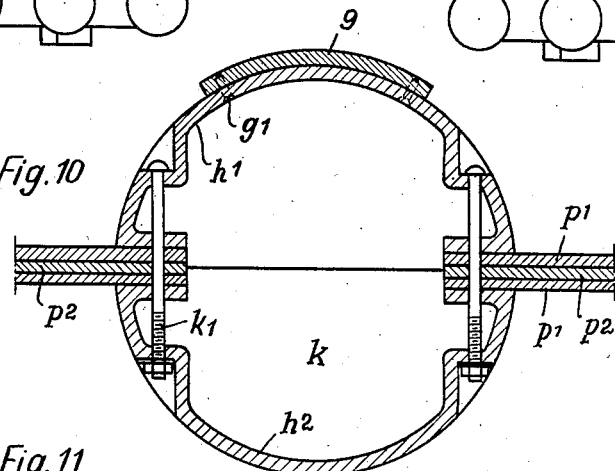
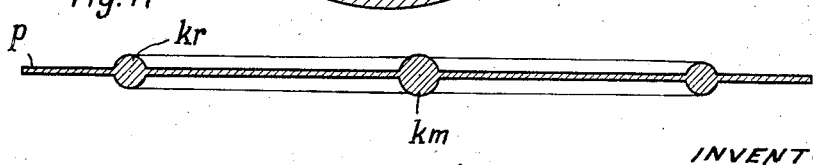

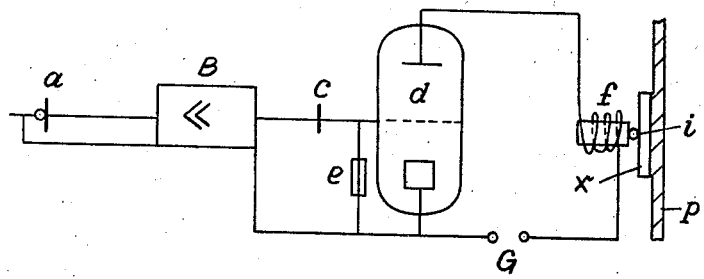
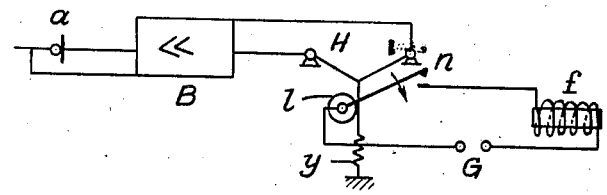
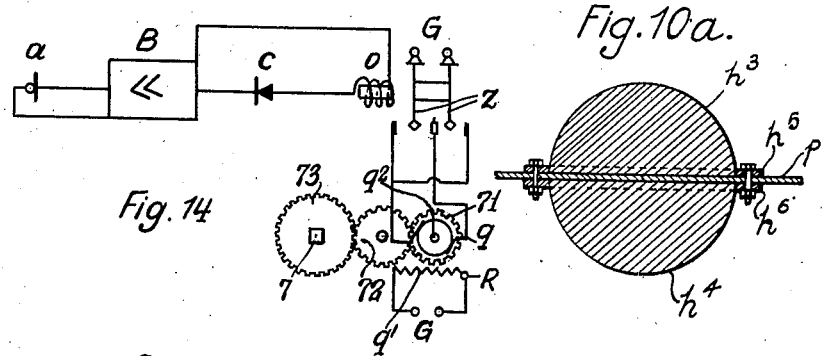
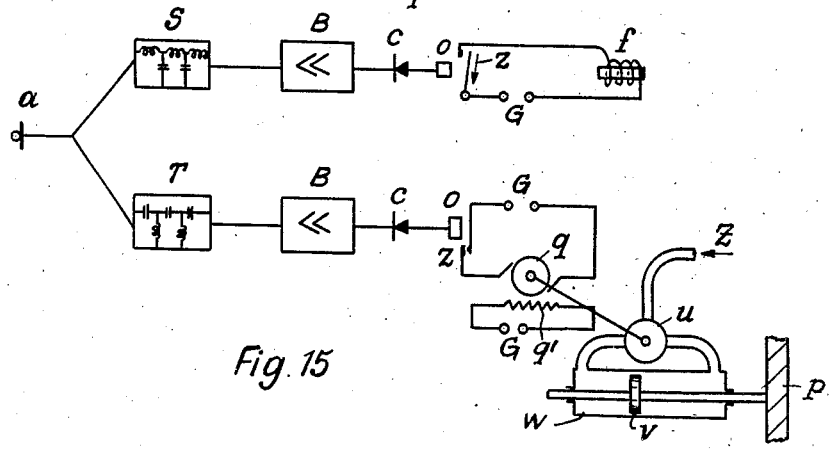

Patented Aug. 20, 1940

2,212,181

UNITED STATES PATENT OFFICE 2,212,181

ACOUSTICAL APPARATUS

Waldemar Oelsner, Copenhagen, Denmark

Application March 22, 1937, Serial No. 132,451
In Denmark March 26, 1936

19 Claims. (Cl. 181—0.5)

The present invention relates to acoustical apparatus and particularly to acoustical structures for lining the walls of a room in order to bring about any desired acoustical characteristics.

It is well known that the acoustic properties of a room may be varied by use of porous sound absorbing substances, but it has been observed that the quality or timbre of the sound suffers from the use of such porous absorbing substances, chiefly because the high frequency constituents of the sound are absorbed to a greater extent than the low frequency constituents. It is also known that the acoustic properties of a room can be altered or adjusted by the use of wall coverings comprising shielding materials capable of oscillating under the influence of sound waves. Heretofore, shielding materials of different weights, not inherently capable of oscillating, and more or less impermeable to air, have been commonly employed. Examples of such materials are canvas, oil cloth, ply-wood, metal fabrics coated with bitumen, and asbestos wool. These materials act only as masses, and are usually separated from the wall of the room by an air layer which acts as a resetting force, the space between the shielding material and the wall frequently containing additional sound absorbing material. Structures of this nature result in relatively high absorption of low frequencies.

The present invention is based upon the discovery that in order to obtain the best acoustical characteristics it is desirable to employ in the room not only sound absorbing structures capable of oscillation, but also, for the improvement of the quality of the sound and the tone formation, and for enhancing the beauty and clarity of the sound picture, to employ in addition to the sound absorbing materials, wall coverings of hard substances such as metal, porcelain, natural and artificial stone, wood and the like, which structures are capable of oscillating in response to the sound waves. By reason of the oscillation of these structures, for example plates, sound energy is withdrawn from the room during moments of great sound intensity and is given back to the room as the intensity of the sound decreases. Such structures as are contemplated by the present invention do not over-absorb the higher frequencies as in the case of those commonly used heretofore.

The present invention is also based on the knowledge that certain properties of the plates or shields forming the acoustic boundary surface extensively influence the sound formation, for example, the relation between fundamental tone and over tone. The vibration of the plates of metal, porcelain and the like used in accordance with the present invention depends upon and responds to oscillations of certain amplitudes and frequencies, from which it follows that any adjustment or alteration of the physical characteristics of the acoustical elements must also produce alterations in the acoustical characteristics of the elements and of the room in which they are employed.

In accordance with the present invention it is proposed to frame the plates or acoustical elements, to give them a certain initial tension in order to limit the extent of their oscillation, to provide damping means, and to provide means for adjusting the tension of the plates and to adjust the damping means as well. These adjustments may be effected manually or by electric or magnetic force. Furthermore, it is possible, in accordance with the present invention, to effect the adjustment according to a predetermined plane, or to have the adjustments made automatically in accordance with the average value of the sound energy within the room and with its frequency distribution. Such automatic adjustment of the damping means and tension of the plates may be carried out, for example, by the use of a microphone within the room, the currents generated in the microphone being employed to actuate means for performing the adjustments referred to.

Another object of the present invention is the provision of damping means arranged behind the plates for regulating the amplitude of the oscillation of the latter, manually or automatically. The damping means, being behind the plates, is not directly subjected to the sound waves in the room, and does not adversely affect their form. As a result of the use of the damping methods contemplated by the present invention, it is possible to employ comparatively thin plates of porcelain, corundum, wood and the like as the acoustical elements to be used in connection with the walls and ceiling of the room. It is possible to produce, for instance by the use of porcelain, very strong oscillating forces, which are capable of imparting to the surrounding air a high degree of activity. It is therefore possible to create an echo-room, in which an acoustic sound transmitter has an effect of long duration.

If relatively thin bodies with rough surfaces are employed, a large surface of contact is provided to be acted upon by the adjacent air particles which are moved in response to the sound waves, and the element or plate is therefore highly responsive. If a damping body, for example, of a soft leather, asbestos, lead foil, or similar soft sound absorbing substances be placed between the plate and the adjacent wall a damping effect is achieved without direct contact of the sound waves with the damping substance. It is possible, by employing such means, to so damp a room that it is practically acoustically dead, without damaging the form of the sound waves and thus destroying the quality of a sound, as is the case when absorbing substances are employed in the manner heretofore known.

Acoustical structures according to the present invention may be employed singly or together, to cover a part of the wall surface of a room, but it is preferred to cover the entire wall and shielding surface of the room, the upper part of the room being preferably lined with plates which are adjusted for rather strong damping effects, whereas that part of the room in which the tone is formed is lined with elements which are especially adapted for tone formation.

Other features and advantages of the present invention will be apparent from the following description taken in connection with the accompanying drawings, in which:

Figures 1–5 illustrate diagrammatically, elements which may be employed for lining the walls and ceiling of a room in accordance with the present invention. The illustrations may be understood to be sections through either a vertical wall or a ceiling, that is, the element may be arranged either vertically or horizontally;

Figure 6 illustrates, partly in section, the construction of the central supporting means employed in connection with the plate elements;

Figures 7 and 8 are sectional views of the means for applying tension to the plates;

Figure 9 is a sectional view of a device applied centrally of the plate for adjusting the oscillating characteristic of the plate, in connection with a damping surface arranged behind the plate;

Figures 10, 10a and 11 are sectional views illustrating details of the construction of the plate elements; and Figures 12–15 are diagrams of electric circuits employed in connection with the means for effecting automatic adjustment of the acoustical characteristics of the plate elements.

Figure 1:
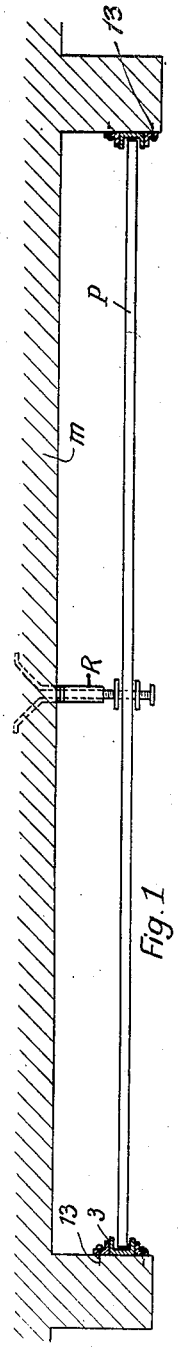

In Figures 1–5, $m$ designates a part of the masonry forming the lateral and upper enclosure of the room. A plate element $p$ inherently capable of oscillating in response to sound waves is attached to the masonry and spaced therefrom. The plate may be supported at its sides by U-shaped holders 3 (Figs. 1, 3 and 5) which are in turn secured to the masonry by dowels 13. A regulating device R (Figs. 1 and 3) by which the oscillation amplitude of the plate may be controlled, acts upon the middle of the plate $p$.

Figure 7 illustrates a suitable form of construction of the regulating device R. The plate $p$ is made of a substance capable of oscillating in response to sound waves. Particularly suitable materials are porcelain, glass, corundum which is obtained from bauxite, wood, metal, and other hard material. A bolt 7 extends through the plate $p$ and is provided with right hand and left hand screw threads $g'$ and $g^2$ respectively. The bolt 70 is journalled in a sleeve 17 set into the masonry $m$ and is secured against axial movements by means of a collar 171 which is held between a flange 172 of the sleeve 17 and a split ring 173, the latter being secured to the flange 172 by means of screws 174. A pair of plates 40 and 41 are threaded onto the right and left hand threads, respectively, of bolt 7 which latter may be rotated by means of a hand wheel 5. Since the screw threads $g'$ and $g^2$ are pitched in opposite directions, rotation of the bolt 7 in one direction serves to move the plates 40 and 41 away from one another, and rotation of the bolt in the opposite direction moves the plates toward one another. Each of the plates 40 and 41 is provided with an elastic lining 80 on the side next to the plate $p$, the lining 80 being of sound damping material, for example felt, and the plates 40 and 41 are secured against rotation by means of pins 70 extending through the plate $p$ and threaded into the plates 40 and 41. The elastic lining 80 is desirable if the plate $p$ is of a sensitive material such as porcelain. On the other hand, if the plate $p$ is of wood the lining 80 may be omitted. By adjusting the plates 40 and 41 with respect to the plate $p$ the initial tension and the acoustical characteristic of the latter may be adjusted. This may be effected manually by turning the hand wheel 5, or automatically as hereinafter described.

It is also possible, as hereinafter explained, to effect adjustment of the acoustical characteristics of the plate $p$ by automatic means including a sound-sensitive device, for example a microphone, so that the tension and oscillating capability of the plate is controlled by the sound conditions in the room.

Figure 2:
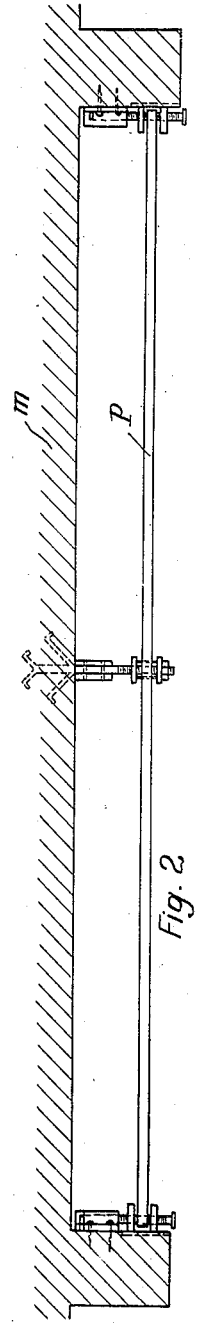

Whereas in Figure 1 the plate is mounted at its rim, with the adjusting means located at its center, this arrangement is reversed in Figure 2. Figure 8 illustrates the details of the arrangement by which it is possible to effect the adjustment at the edges of a plate mounted at the center, and Figure 6 illustrates the mounting of the plate. The plate $p$ is provided with a central aperture, through which extends a bolt 10 securely anchored in the masonry. A plate 44 having an internally threaded hub 440 is mounted on the bolt 10 and faces the masonry. The hub 440 is internally and externally threaded so that a plate 45, arranged on the other side of the plate $p$, may be threaded onto the hub 440 by means of an internally threaded hub 450, as shown in Figure 6. As in the case of the arrangement illustrated in Figure 7, the plates 44 and 45 may be provided with protective layers 80, if the plates $p$ are sensitive, as in the case of porcelain, for example. When the plates 44 and 45 have been adjusted into proper relation to the plate $p$, they may be held in such position by means of a nut 100. The means for adjusting the oscillating capability of the plate $p$ mounted at the center, of which several may be employed in connection with each plate, is illustrated in detail in Figure 8. This construction is fundamentally similar to that shown in Figure 7, the principal difference being that the inner plate 4 is of angular cross section.

Figure 3:
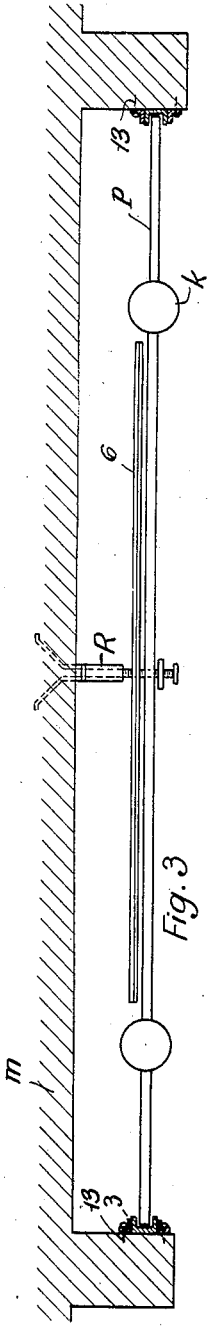

It is possible to predetermine the acoustical characteristics of the plates $p$ by concentrating the mass thereof at suitable points, for instance, at the center of the plate or at the side, such mass concentrations taking the form of separate knobs, or a continuous form, as shown in Figures 3 and 5. Figure 3 shows the knob-like mass concentrations disposed toward the sides of the plate, while Figure 5 shows the mass concentration disposed at the center of the plate. A particularly simple form of mass concentration is the spherical form illustrated in Figures 3 and 5, and if desired, a ring of such knob-like elements may be employed. For example, the arrangement of these knob-like elements may be rectangular, circular, or elliptical. By means of the aforesaid knob-like mass concentrations the acoustical effect of the plate $p$ can be predetermined in a certain sense.

By the use of mechanical damping means, the degree of oscillation of the system may be altered. Such a construction is illustrated in Figure 3, in which the plate $p$ is supported by the means and adapted to be adjusted in the manner illustrated in Figure 1, that is, it is supported at the side and is adapted to be adjusted at the center by the means R. On the side of the plate $p$ facing the masonry there is arranged a separate disc-shaped body 6 of soft leather, felt, asbestos, lead, wood or the like, which produces a damping effect. By adjusting the distance between the damping body 6 and the plate $p$, the kind and amplitude of the elastic pressure charge in the plate $p$, resulting from the action of the air oscillations thereon, and the oscillation and acoustical effect of the plate $p$ resulting therefrom, can be regulated without the damping body 6 having any direct influence upon the air oscillations.

The adjusting device R is illustrated in Figure 9, and in principle is similar to the adjusting device of Figure 7, but is constructed so that the plate 41 serves as a carrier for the damping body 6. The latter comprises a supporting and stiffening body 90, and a damping layer 100, made of metal foil, felt or the like. The thickness of the plates is exaggerated in Figure 9 for clarity of illustration. The plates 40 and 41 are held against rotation by the pins 70, and the plate 41 carries additional pins 49 which secure the supporting body and the damping layer 100. When the spindle 7 is turned, the position of the damping body 6 relative to the plate $p$ is varied, the relative position of the plates 40 and 41 being also varied.

Figure 4:
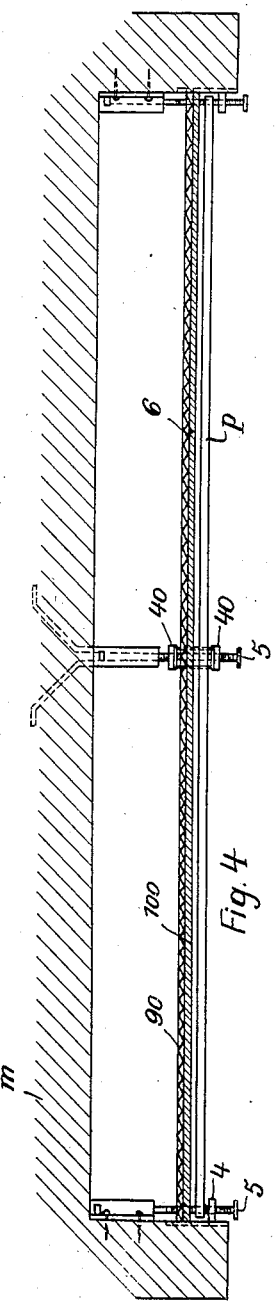

Figure 4 illustrates an embodiment in which the damping body 6 extends behind the entire area of the plate $p$. The damping body comprises, as in the case of Figure 9, a supporting body 90 and a damping layer 100, the supporting body 90 consisting of stays.

In this embodiment, adjusting devices 40, 5 are provided at the center of the plate $p$ and also adjusting devices 4, 5 at the sides, the arrangement of Figure 4 therefore being a combination of the arrangements illustrated in Figures 1 and 2, in conjunction with a damping body 6 which consists of a supporting body 90 and a damping layer 100.

This construction therefore does not require special description.

Whereas the embodiments of Figures 1-4 provide for adjustment by means of spindles, Figure 5 illustrates how the oscillating capability of the plate $p$ may be influenced electromagnetically. The construction according to Figure 5 differs from that illustrated in Figure 1 in that the manual adjusting means R at the center of the plate is replaced by electromagnetic means comprising an armature plate 9 and an electromagnet 8. In the illustrated embodiment, the armature plate 9 is shown as mounted on a knob-like mass concentration $k$, but the latter is not essential.

It is evident that when the electromagnet 8 is excited the armature plate 9 will be attracted, thus producing a tension at the middle of the plate $p$, which is mounted at the sides. As hereinafter explained, the excitation of the electromagnet 8 may be automatically controlled by the sound conditions in the room, or can be voluntarily regulated by means to be described.

Figure 5 also illustrates, in combination with the electromagnetic adjusting means, the mechanical adjusting means comprising a bridge $b$ mounted on the masonry $m$ and having a spindle $s$ by means of which the plate $p$ can be tensioned at the center, the end of the spindle $s$ bearing against the knob $k$.

Figure 10 illustrates the construction of the knob $k$ of Figure 5. The plate $p$ is in this instance composed of three layers, the two outer layers $p'$ being of wood, fiber or the like and the center layer $p^2$ being of felt or lead, that is, a material comparatively inert to oscillation. Two similar hemi-spherical members $h'$ and $h^2$ are secured on opposite sides of the plate $p$ by means of bolts $k'$, the hemi-spherical members $h'$ and $h^2$ being provided with recesses for the reception of the bolt heads and the nuts. At the point where the knob $k$ is located, the plate $p$ can be cut away as illustrated in Figure 10. A plate 9 of iron or nickel is secured to the hemi-spherical member $h'$ by means of screws $g'$, and serves as an electromagnetic armature, as in the construction illustrated in Figure 5.

The knobs $k$ may also be formed solid, as illustrated in Figure 10a. In this case, the respective hemi-spheres $h^3$ and $h^4$, which are solid, are provided with flanges $h^5$ and $h^6$, respectively, and are secured to the plate $p$ by means of bolts.

Figure 11 illustrates a mass concentration arrangement comprising an annular formation $kr$ and a knob $km$ located centrally of the formation $kr$. In this case, the mass concentrations are not formed as separate bodies, but are formed out of the material of the plate $p$, which may be porcelain, wood, or stone-like material, for example, and the mass concentrations $kr$ and $km$ may be formed on the plate by planing, milling, or in any other suitable manner.

In the case of plates provided with the above described mass concentrations, the inertia of the mass concentrations serves to brake the movements of the plate and, at the same time, provides for a steady and secure oscillation of the plate regardless of the direction of the sound flow, that is, regardless of the location of the sound source relative to the plate. If, for instance, a thin porcelain plate is placed so that a projecting corner of a wall, or some other body, is between the plate and the source of sound, so that the sound oscillations strike only a portion of the plate, such portion of the plate might oscillate more or less as a separate element, the remainder of the plate being substantially acoustically dead, thus forming a dead point in the room. By pre-adjusting the system to a certain type of oscillation, by means of mass concentrations such as described, such dead points may be prevented, and the nature and extent of response of the system to the sound oscillations may be predetermined.

In place of the manual adjusting means described above, the adjustment of the tension of the plate, either at the middle or at the edge, may be effected automatically by means now to be described. Likewise, the adjustment of a damping body, such as the body 6 of Figures 3 and 4, may be automatically effected. Figures 12-15 illustrate circuit diagrams employed in connection with the automatic adjustment referred to above.

The purpose of the automatic means to be described is either to electromagnetically attract the plates *p* at the center or at the edge, so that their tension is altered, or to vary the distance from the plate of the damping body 6 of Figures 3 and 4. In carrying out this purpose, as illustrated in Figure 12, a sound receiver *a* is arranged at that point in the room, the sound condition of which is to be effected. The sound receiver *a* acts, through the intermediary of an amplifier B and rectifier *c* upon a triode or thyratron *d*, that is, a grid controlled rectifier, so as to alter the characteristic of the latter in such a manner that the current flowing from the source of potential G through the triode *d* and the electromagnet *f* is increased or diminished, thus attracting or releasing the armature *x* secured to the plate *p*. By properly selecting the time constants of the electromagnet *f*, the rapidity and extent of its effect upon the armature *x* may be controlled as desired, if necessary with the aid of a suitably shaped rubber damper *i*, interposed between the magnet *f* and armature *x*.

Another type of automatic adjustment of the tension of the plates *p*, or the damping condition thereof, can be effected by means of a system in which the sound oscillations are caused to act indirectly upon a contact device included in the circuit with the potential source G and electromagnet *f*. In this arrangement, illustrated in Figure 13, the sound receiver *a*, through the amplifier B, energizes a heating wire H, to which is connected a cord extending around a roller *l* and connected at its other end to a spring *y*. The roller *l* carries a contactor *n*. The heating wire H is not responsive to instantaneous variations in the sound pressure, but tautens or loosens in response to the average sound pressure over longer periods. As the wire H varies in tension, the roller *l* is caused to oscillate, opening and closing the contact *n*, energizing and deenergizing the electromagnet *f*.

Instead of automatically varying the excitation of the electromagnet *f*, and thus varying the tension of the plate *p*, the pressure of damping bodies against the points of clamping or holding of the plates *p* or the distance of damping body 6 from the plates *p* can be altered by moving the spindles 7 of Figures 7, 8 or 9, by hand, or by other means such as an electric motor. Figure 14 illustrates an example of the latter type of control. By means of an arrangement such as that illustrated in Figure 12, a relay *o* is electromagnetically controlled.

The relay switch blades, connected to a source of potential G, are arranged so as to make no contact when in intermediate position. The motor field *q'* being constantly energized, when the magnet *o* is underexcited the switch blades will move to the left and the motor armature *q* will be energized to move in one direction, while if the magnet *o* is overexcited the armature *q* will rotate in the opposite direction. The motor is connected with the spindle 7 (Figures 7, 8, 9) through a gear 71 on the shaft $q^2$ of the armature *q*, the gear 71 meshing with an intermediate gear 72 which in turn meshes with a gear 73 on the spindle 7.

According to the present invention the entire frequency range of the system in the room should be capable of regulation as to acoustical properties. Also, it is frequently desirable not to influence all frequencies in the same manner by similarly adjusting all of the plates, but may be desirable to employ certain plates to affect only the deeper frequency constituents of the sound and to employ other plates for influencing the higher frequency constituents. Figure 15 illustrates, diagrammatically, how after the sound reception at *a*, the currents corresponding to the different frequency constituents are conducted to different amplifiers B through a filter S which passes the low frequency currents (indicated by a series of choke coils) and a filter T which passes the high frequencies (indicated by a series of condensers). In a similar manner, individual narrow frequency ranges can be selected by means of band pass filters. In the embodiment of Figure 15, the lower frequency constituents influence the electromagnet *f*, as described in connection with Figures 12 and 13. For the higher frequency constituents an example is shown of how the motor *q*, *q'* controls, by means of a three-way cock *u*, a flow of water under pressure coming from Z, so that the piston *v*, in the pressure cylinder *w*, is moved to the right or to the left and thereby influences the plate portion *p* rigidly connected with the piston.

In Figures 1 to 5, either a vertical or a horizontal position of the plates *p* is assumed, according to whether the plate is in front of a wall or of a ceiling. For corrective purposes the system must be able to assume positions between horizontal and vertical, which may be accomplished, for example, if the guides 8 in Figure 5 are pivotally mounted on the masonry *m*. In such an arrangement, if the armature plate 9 on the spherical knob *k* is made correspondingly large, the electromagnet will be able to act upon it in the manner described above.

I claim:

1. In combination with a room having boundary faces, apparatus for regulating the acoustic properties of said room, comprising oscillatory plate-like elements mounted in front of the boundary faces of the room and spaced therefrom, and means associated with each said element for engaging said element to limit the oscillations thereof, said last means being adjustable for varying the acoustic effect of said elements.

2. Apparatus as defined in claim 1, certain of said plate-like elements being especially responsive to high-frequency sound waves, and others of said elements being especially responsive to low-frequency sound waves.

3. Apparatus as defined in claim 1, and manually operable means for adjusting said oscillation limiting means.

4. Apparatus as defined in claim 1, and electrical means for adjusting said oscillation limiting means, said electrical means being responsive to variations in the average value of the sound pressure prevailing in said room.

5. Apparatus as defined in claim 1, each said oscillation limiting means having a handle for manual operation, and electrical means associated with each said oscillation limiting means for automatically actuating the same.

6. Apparatus as defined in claim 1, and electrical means for automatically actuating said oscillation limiting means, said electrical means being electrically connected with a sound responsive device within said room.

7. Apparatus as defined in claim 1, certain of said plate-like elements being especially responsive to high-frequency sound waves, and others of said elements being especially responsive to low-frequency sound waves, and electrical means associated with each said element for actuating said oscillation limiting means, said electrical means associated with said high-frequency responsive elements being especially responsive to high-frequency sound waves, and said electrical means associated with said low-frequency responsive elements being especially responsive to low-frequency sound waves.

8. Apparatus as defined in claim 1, said oscillation limiting means comprising means for varying the mechanical tension of said plate-like elements.

9. Apparatus as defined in claim 1, characterized by the provision of means supporting said elements adjacent their centers, said oscillation limiting means being adapted to act upon said elements adjacent their edges.

10. Apparatus as defined in claim 1, characterized by the provision of means supporting said elements adjacent their edges, said oscillation limiting means being adapted to act upon said elements adjacent their centers.

11. Apparatus as defined in claim 1, said oscillation limiting means being adapted to support and act upon said elements adjacent their centers and adjacent their edges.

12. Apparatus as defined in claim 1, said oscillation limiting means including lining means for damping the oscillations of said elements.

13. Apparatus as defined in claim 1, said oscillation limiting means including damping means arranged behind said elements adjacent the portions thereof having the greatest amplitude of oscillation.

14. Apparatus as defined in claim 1, said plate-like elements having portions of concentrated mass.

15. Apparatus as defined in claim 1, said plate-like elements being provided with knob-like mass accumulations.

16. Apparatus as defined in claim 1, characterized by the provision of bodies secured to said elements and affecting the mass distribution thereof.

17. Apparatus as defined in claim 1, one of said oscillation limiting means comprising an armature secured to said element, and electromagnetic means for variably attracting said armature.

18. Apparatus as defined in claim 1, said oscillation limiting means comprising electromagnetic means for automatically varying the tension of said respective elements, and manually operable means for varying at will the tension of said elements.

19. Apparatus as defined in claim 1, said oscillation limiting means comprising spindles extending through said elements, means threaded on said spindles on opposite sides of said elements for limiting the amplitude of the oscillations of said elements, and means for rotating said spindles to alter the distance between said limiting means.

WALDEMAR OELSNER.